Nov. 22, 1932.  R. J. JAUCH ET AL  1,888,533
LIQUID DISPENSING APPARATUS
Filed June 3, 1932  4 Sheets-Sheet 1

Inventors:
Robert J. Jauch,
Ivan R. Farnham,
Ross H. Arnold,

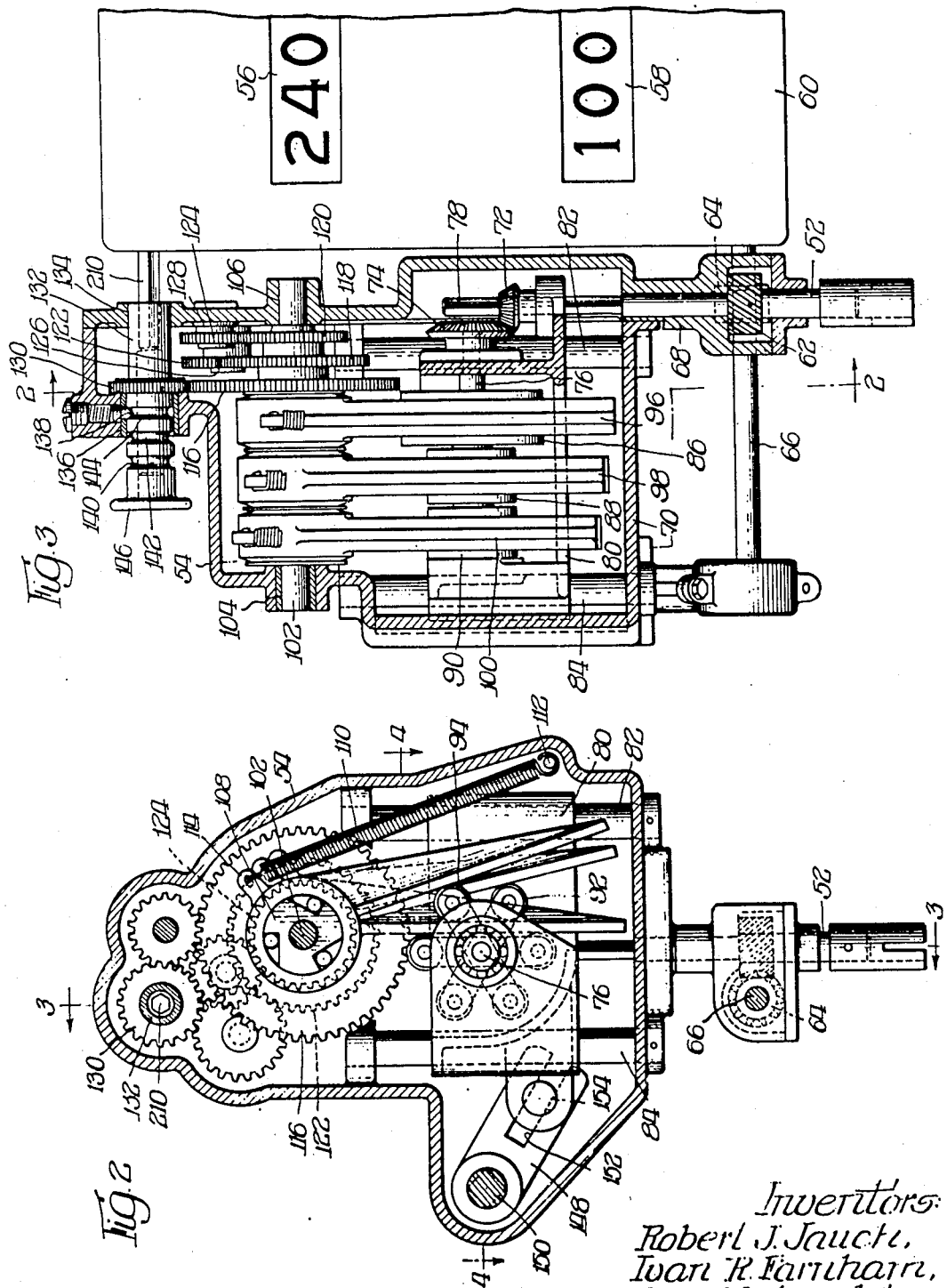

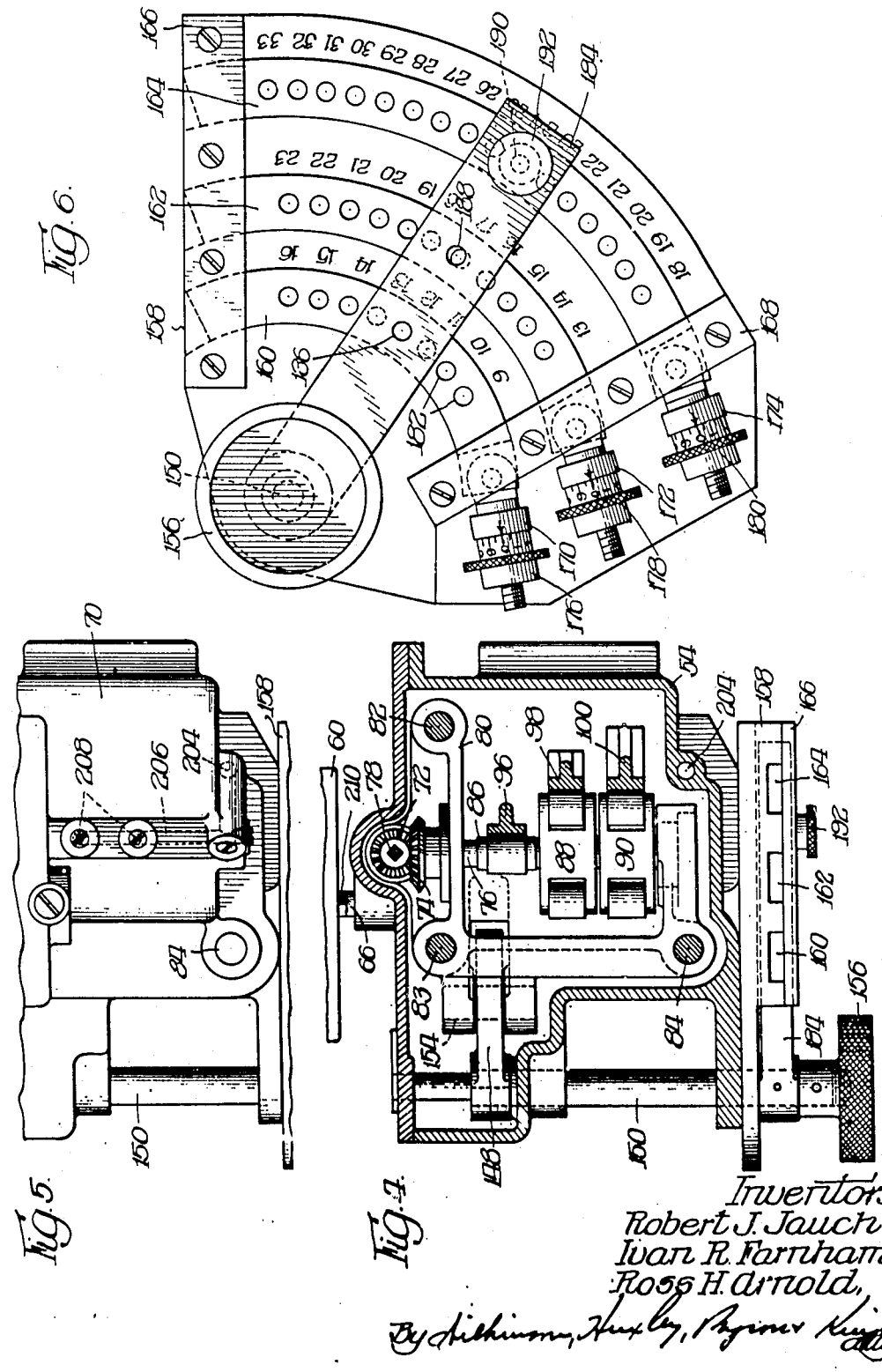

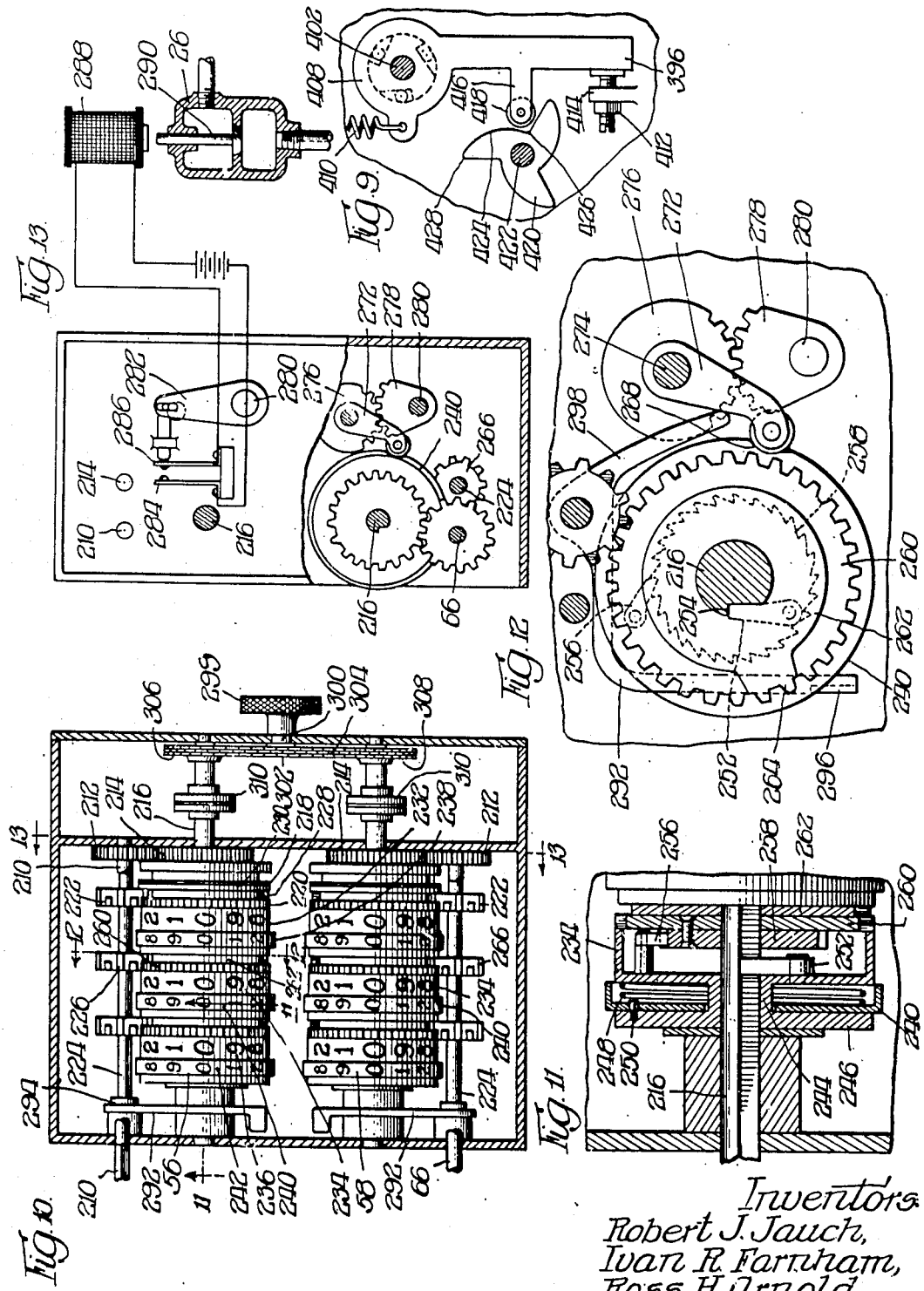

Patented Nov. 22, 1932

1,888,533

UNITED STATES PATENT OFFICE

ROBERT J. JAUCH, IVAN R. FARNHAM, AND ROSS H. ARNOLD, OF FORT WAYNE, INDIANA, ASSIGNORS TO WAYNE COMPANY, OF FORT WAYNE, INDIANA, A CORPORATION OF INDIANA

LIQUID DISPENSING APPARATUS

Application filed June 25, 1930. Serial No. 463,627.

This invention pertains to liquid dispensing apparatus.

Liquid dispensing apparatus now in use are of two principal types, namely, the so-called visible type, and the meter type. The more desirable of these two types is the meter type, which consists essentially of an operating pump connected to a source of liquid supply, the pump being adapted to supply liquid to a meter where it is measured, after which it is dispensed through the usual hose and nozzle connection. The meter is adapted to operate a clock or other recording mechanism to show the amount of liquid dispensed through the hose and nozzle. It is customary to provide this type of liquid dispensing apparatus with a card to be displayed somewhere on the casing adjacent the clock, the card being used to compute the price of any amount of gasoline or other liquid dispensed from the device. The objections to this method of computation are that for different localities different cards must be used as the prices vary, and of course the prices vary for the same localities from time to time. There is then the liability that the cards may not be supplied at the proper time, and also the objection that the figures on the computing card are so small that the customer purchasing gasoline from a dispensing station cannot see the numerals from his automobile, there being grave dangers of error in either case. There is a further objection that the prices on these cards are only for full gallon units, and if a fraction of a gallon is dispensed there is no way of accurately determining the cost of this amount. Also, in meter pumps there is no positive way to dispense only a unit, and so in case the registering hand of the clock overruns the unit measure, either the customer has to pay an estimated amount, or the service station owner has to lose this fraction of a unit to the customer.

It is therefore an object of this invention to provide a liquid dispensing apparatus which itself registers both the amount of liquid dispensed and also registers the total price of such liquid dispensed.

Another object is to provide a liquid dispensing apparatus wherein means is provided for indicating the total price of any amounts of liquid dispensed, as for example gallons or fractions thereof, the means being adjustable at the liquid dispensing apparatus to correspond to any price variations of units dispensed.

A further object of the invention is to provide a liquid dispensing apparatus wherein mechanism is provided for selecting the number of units to be dispensed by limiting the operation of the apparatus by the price to be expended.

A still further object is to provide a motor operated liquid dispensing apparatus having a measuring and recording meter and automatically actuated computers for indicating the quantity of liquid dispensed or to be dispensed and the price charged or selected for the total amount of liquid so dispensed, and wherein a totalizing mechanism is provided to at all times accurately disclose the total quantity of liquid dispensed and the total amount of dollars and cents received for the same.

Yet a further object is to provide a self-lubricating meter for liquid dispensing apparatus.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation of a liquid dispensing apparatus embodying the invention;

Figure 2 is an enlarged sectional side elevation through the meter operating mechanism, the same being taken substantially in the plane as indicated by line 2—2 of Figure 3;

Figure 3 is a fragmentary sectional side elevation of the operating mechanism shown in Figure 2, the same being taken substantially in the plane as indicated by the line 3—3 of Figure 2;

Figure 4 is a fragmentary sectional top plan view of the operating mechanism shown in Figure 2, the same being taken substantially in the plane as indicated by the line 4—4 of Figure 2;

Figure 5 is a fragmentary top plan view of the meter operating mechanism casing showing the oil conduits;

Figure 6 is a fragmentary end elevation of the pre-determined vernier setting and selecting mechanism for the drive mechanism illustrated in Figures 2, 3 and 4;

Figure 7 is a fragmentary end elevation of the meter operating mechanism showing the application thereto of the lubricating means;

Figures 8 and 9 are modified forms of speed variator control means;

Figure 10 is an enlarged fragmentary sectional elevation through the pre-selecting dial mechanism;

Figure 11 is an enlarged fragmentary sectional elevation taken substantially in the plane as indicated by the line 11—11 of Figure 10;

Figure 12 is an enlarged fragmentary sectional elevation taken substantially in the plane as indicated by the line 12—12 of Figure 10; and Figure 13 is a fragmentary sectional end elevation of the indicating mechanism illustrated in Figure 10 showing a more or less diagrammatic means for causing the meter to render the liquid dispensing apparatus inoperative.

Figures 1, 7, 8:
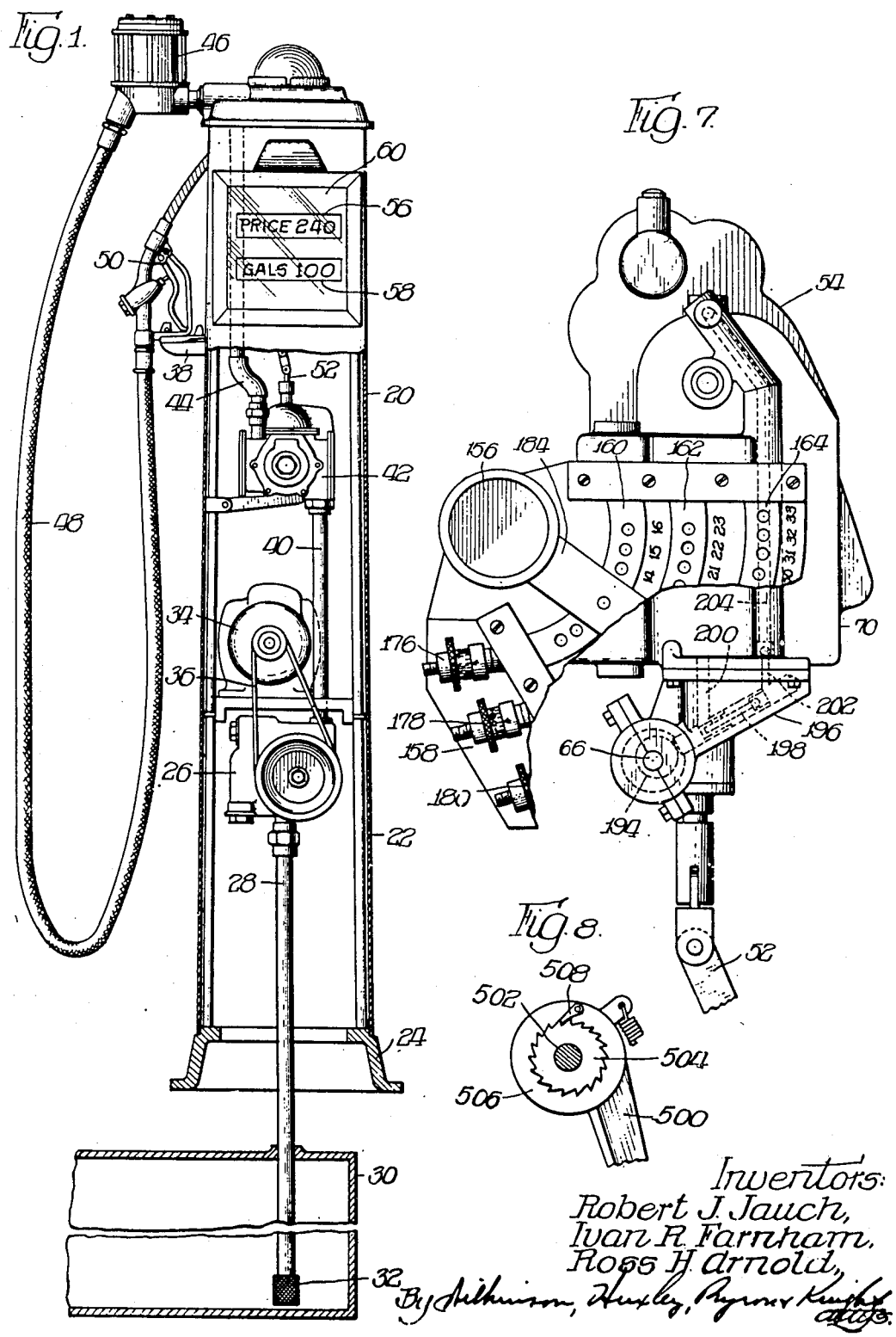

Referring first of all more particularly to the construction illustrated in Figures 1 to 6 inclusive, the liquid dispensing apparatus 20 includes a casing 22 supported on the pedestal 24. The pump 26 is connected on the suction side thereof to the pipe 28 which is in communication with the source of liquid supply 30 through the foot valve 32. The pump is adapted to be operated by motor 34 through suitable means, such as the belt 36, the pump being controlled through a suitable switch operated from the hose hook or support 38. The outlet side of the pump 26 is connected to the pipe 40, connected to the inlet side of the meter 42 which may be of the piston displacement type or any suitable type accurately measuring the amounts of liquid supplied thereto and passing therethrough, the measured liquid flowing through the pipe 44 to the sight gauge 46 and being dispensed through the hose 48 and the hand operated nozzle 50. As shown in Figure 1, the nozzle is supported on the hook 38, in which position the motor 34 is inoperative. In order to operate the motor it is necessary to remove the nozzle 50 from the hook 38 and to raise hook 38, and it is necessary for measuring operation of the meter that the valve in the nozzle 50 be operated to permit the flow of liquid therethrough. The operation of the meter 42 operates the shaft 52, said shaft being rotatable to operate the mechanism of the clock operating mechanism 54. The operation of the clock operating mechanism 54 will cause the numerals to appear in their proper sequence and relation on the dials 56 and 58, to indicate the price and the number of units dispensed respectively on the clock device 60.

Referring now more particularly to the operation of the clock or indicator operating mechanism 54, the shaft 52 is provided with worm 62 meshing into gear 64 mounted on shaft 66, the shaft 66 operating the unit indicating figures on the dial 58 of the clock 60 in a manner to be more particularly described. The shaft 52 is journalled at 68 in the casing 70 and is provided with the bevel gear 72, meshing with bevel gear 74 mounted on cam shaft 76, gear 72 being slidably mounted on the squared portion 78 of the shaft 52 but provided with a complementary cooperating squared portion whereby the gear 72 rotates with the shaft 52. Cam shaft 76 is journalled on the yoke or carriage 80 slidably mounted on the spaced guides 82, 83 and 84 mounted in the casing 70.

Cam shaft 76 is provided with spaced cam members 86, 88 and 90 mounted to rotate with said shaft and being provided with antifriction cam rollers 92 mounted on the cam arms 94, the arms of each cam being set at sixty degrees from the succeeding cams. Operating or cam fingers 96, 98 and 100 are oscillatably mounted on shaft 102 journalled at 104 and 106 in the casing 70, said fingers being mounted on shaft 102 through suitable clutches 108 operable in one direction only, whereby oscillation of the fingers 96 will cause rotation of the shaft 102, it being seen that, due to the setting of the arms 94 with respect to each other, the cams will cause continuous rotation of the shaft 102 corresponding to rotation of the shaft 76 without interruption of rotation of the shaft 102, the speed of rotation of shaft 102 depending upon the distance between the center lines of the shafts 76 and 102. The cam and finger mechanism therefore is a speed variator. The fingers are normally urged towards the cam by means of contractual springs 110 fastened to the casing at 112 and to the fingers through the lugs 114.

The shaft 102 in the present embodiment of the invention is provided with three related gears 116, 118 and 120 mounted for rotation on the shaft 102, the smaller gears 118 and 120 being provided with suitable idler gears 122 and 124 pivotally mounted on jack shafts 126 and 128 on the casing, and being disposed in the path and adapted to be selectively engaged by the gear 130 mounted on the shaft 132 journalled for sliding movement in the casing as at 134 and in the bushing 136 carried inside the casing, whereby a transmission device is provided. The gear 130 is maintained in selected engagement with the gear 116 or the idlers 122 and 124 by means of engagement between the spring-pressed plunger 138 and the grooves 140, 142 and 144, provided in the setting knob 146 mounted on shaft 132, the grooves being spaced apart at the centers thereof, the distances being equal to the distances between the centers of the gears 116, 122 and 124, the plunger being limited in engaging position by engagement between a shoulder provided thereon and a portion of the bushing 136.

As has already been stated, the speed of rotation of shaft 102 is controlled by the distance between the shafts 76 and 102, the speed increasing as the distance between the shafts is decreased, the movements of the shaft 76 being effected by the carriage 80. The carriage 80 is adapted to be slidably moved by means of the lever 148 mounted on the shaft 150, the lever being provided with slot 152 engaging the pin 154 provided on the yoke 80. The shaft 150 extends outwardly of the casing and is provided with selecting knob 156 mounted adjacent the pre-determining sector 158. The sector 158 is provided with spaced setting and selecting quadrants 160, 162 and 164 corresponding respectively to the gears 120, 118 and 116, the quadrants being slidably mounted in suitable tracks 166 and 168, each quadrant being provided with vernier adjustments 170, 172 and 174. Each adjustment is calibrated to determine the registering movement of one-tenth of a cent for every complete turn of the setting knobs 176, 178 and 180, each knob being so calibrated whereby graduations to one-hundredth of a cent may be determined. Each quadrant is provided with spaced apertures or indentations 182 spaced apart a suitable distance or suitably calibrated to determine suitable money units as, for example, the difference in distance between the successive apertures 182 determines one cent; this being only true and determinable by virtue of the relation between the shaft 66, which registers the number of gallons dispensed, and the calibrations on the various quadrants, which in turn are directly related to the movement of the shaft 132 by proper engagement between the gear 130 and the gears 116, 122 and 124.

The shaft 150 is provided with a selecting arm 184, said arm being mounted to rotate with the shaft 150, said arm being provided with the spaced apertures 186, 188 and 190 adapted to be aligned with the selected apertures 182 on the proper quadrants 160, 162 and 164, depending upon the meshing of gears 130 and 124, 122 and 116, as determined by the price desired. The selecting arm is provided with a pin which is adapted to be inserted into selected apertures 186, 188 or 190, to align said apertures with the selected apertures 182 on any of the quadrants, it being borne in mind that the movement of the selecting arm rotates the shaft 150 to position the carriage 80 and selecting apertures 182 and the quadrants 160. For example, aligning apertures 190 and 182 by means of the pin 192 as shown in Figure 6, only causes proper operation and coordination of the shafts 132 and 66 when the gear 116 is in engagement with the gear 130. Similarly, selection of the prices on the quadrant 162 only properly operates the device when the gear 130 is in cooperative engagement with the gear 122 and when the gear 130 is in cooperative relation with gear 124 selection is made by pin 192 on quadrant 160.

In order to properly lubricate the device, the shaft 66 is provided with a cam 194 disposed in the pump housing 196 secured to the bottom of the casing 70. The pump casing 196 is provided with a piston pump mechanism 198 reciprocally mounted in the casing and communicating through the channel 200 with the bottom of the casing 70. The casing 70 is adapted to be provided with lubricant, the bottom of the said casing therefore forming a sump or oil reservoir for supplying oil to the pump. The rotation of the shaft 66 reciprocates the piston which receives the lubricant through the channel 200 and pumps it under pressure through the channel 202. The channel 202 is in communication with the channel 204 provided in the casing 70, the channel 204 extending upwardly and in communication with the channel 206 disposed across the top of the casing 70 adjacent the shaft 102, suitably spaced apertures 208 being provided in the casing communicating with the channel 206 whereby lubricant is sprayed into the top of the casing 70 to any desired point, particularly the mechanism mounted on shaft 102.

Referring now particularly to the operation of the device illustrated in Figures 1 to 7 inclusive, assuming that both the price dial 56 and the amount dial 58 are set to zero position and the liquid dispensing apparatus is in inoperative position, such as illustrated in Figure 1, in order to dispense liquid to any receptacle, for example an automobile tank, the nozzle 50 is removed from the hook 38 and inserted into the fill opening. Upward movement of hook 38 will close a suitable switch to cause operation of the motor 34 and consequently the pump 26. No liquid will be dispensed, however, until the valve in nozzle 50 is opened. Until this takes place the liquid is merely by-passed in a suitable by-pass provided in the pump 26. Upon operation of the nozzle 50, liquid will be drawn from the source of liquid supply 30 through the pipe 28 and supplied through pipe 40 to the meter 42 where it will be measured and will be supplied from the meter through pipe 44 to the sight gauge 46, the hose 48 and thence to the tank through the nozzle 50.

Measuring operation of the meter will cause shaft 52 to rotate. Assuming that the meter operating mechanism is to be set for liquid to be dispensed at twenty-four cents a gallon, in order to be set at this amount the pin 192 is caused to be entered in the apertures 190 and 182, the latter being on the large quadrant 164 and at the calibrated point marked 24. If the liquid is to be dispensed at only twenty-four cents, the vernier 180 will be set to zero position. If it is to be dispensed at twenty-four and one-tenth cents, the vernier is revolved through a complete revolution. In this manner any number of tenths may then be determined, it being borne in mind that a tenth of a cent is indicated by every complete turn of the knob 180, and also knobs 176 and 178. In order to have a corresponding registration on the dial 56 the gear 130 must be set to mesh with gear 116, such as shown in Figure 3.

Rotation of the shaft 52 will cause rotation of the shaft 76 through the bevel gears 72 and 74. Rotation of the shaft 76 will cause the cams to oscillate the fingers 96, 98 and 100 whereby the shaft 102 will be rotated through the clutches. As the cams are set at sixty degrees to each other, and as three are provided, there will always be an overlap in the operation of succeeding fingers so that there will be a continuous rotation of the shaft 102 without an intermittent cessation of rotation. Rotation of the shaft 102 will cause the gear 116 to rotate gear 130 whereby the counter shaft 132 will rotate. In resetting of the selecting arm to cause registration between the different apertures, movement of the arm will correspondingly raise or lower the carriage 80 to properly dispose the cams to vary the speed of rotation of the shaft 102 due to the variation of the paths of movement of the fingers 96, 98 and 100. As has already been described, quadrants 162 and 160 correspond to gears 122 and 124, so whenever these quadrants are used for price setting the gear 130 must be moved to mesh with either the gears 122 or 124, depending upon which quadrant is being used.

In the constructions shown in Figures 8 and 9, modified forms of speed variators are illustrated. In Figure 8, the operating finger 500 is of a construction similar to those already described. The finger, however, is loosely mounted on the shaft 502 (corresponding to shaft 102) the shaft being provided with the ratchet 504, the hub 506 of the finger being mounted adjacent thereto. The hub 506 is provided with the pawl 508 adapted to rotate the ratchet and consequently the shaft 502 upon movement of the finger 500. It is of course understood that this construction may be reversed. That is, the ratchet may be mounted in an opposite direction on the finger and the pawl carried on the driven shaft.

In the construction shown in Figure 9, the finger 396 is mounted on the shaft 402 through the clutch 408. The spring 410 normally urges the finger toward the adjusting screw 412 mounted on the lug 414 provided on the casing. The finger 396 is provided with an arm 416 having the anti-friction roller 418 normally urged toward the cams 420 mounted on the shaft 422 (corresponding to shaft 76). In this form of construction it is not necessary to provide movement of the shaft 422 with respect to the shaft 402 in order to vary the speed of the shaft 402. In order to change the speed of rotation of the shaft 402, the cams 420 have a steeper pitch from 424 to 426 than they have from 424 to 428. With the adjusting screw 412 in the position shown, very little of the cam section, 424 to 426, would be utilized, and consequently the speed of the shaft 402 would be practically constant. Lowering the adjusting screw 412 to approach the roller 418 nearer the shaft 422 permits the roller to touch the cam nearer the point 426, and the rotation of the shaft 402, therefore, is accelerated slightly until the point 424 reaches the wheel, with the result that the R. P. M. of shaft 402 is increased. In the cases of the constructions illustrated in Figures 8 and 9, as before, substantially continuous movement of the driven shaft is insured by providing three or more fingers, the operating cams of which are overlapped in the manner already described.

The form of dial mechanism to be used for the price and amount dials may be of any suitable construction, the dial mechanism illustrated in Figures 10 to 13, inclusive, being provided with pre-determining selecting mechanism, though it will be appreciated that similar dial mechanism may be employed without utilizing the pre-selecting means, or the pre-setting means may be rendered inoperative.

In the counter mechanism assembly, there is shown the registering wheels and operating mechanism therefor as applied to both dials 56 and 58; the description of one dial only is given in detail as the operation of each is the same. Rotation of the shaft 132 will cause rotation of the shaft 210, said shaft being provided with gear 212 adapted to rotate therewith. The gear 212 meshes with the gear 214 mounted to rotate on the resetting shaft 216. Rotation of shaft 210 in a counter-clockwise direction causes rotation of the clutch 218, said clutch being mounted on shaft 216 and adapted to rotate with respect thereto, the plate of the clutch adjacent the gear 214 being adapted to be rotated thereby. The clutch 218 in turn operates the gear 220, said gear meshing with the tooth gear 222 mounted for rotation on the shaft 224. Gear 222 is provided with stepped teeth 226 adapted to be engaged by spaced teeth 228 mounted on the clutch plate 230 whereby when the spaced teeth 228 engage the stepped teeth 226 on the gear 222 they will cause rotation of the gear 222 to in turn rotate the gear 220, the gear 220 being secured to the numeral wheel 232, the spaced teeth 228 causing just sufficient rotation of the gear 220 to rotate the numeral wheel 232 to the next succeeding number, the rotation of the wheel being in a clockwise direction. Continued operation through the gear 228 will cause operation of succeeding numeral wheels 234 and 236 in a similar manner through similar mechanism, it being understood that similar mechanism is employed.

In order to provide pre-selecting of the amounts to be dispensed, pre-selecting numeral wheels 238, 240 and 242 are provided mounted adjacent the numeral wheels 232, 234 and 236. Each of these pre-selecting numeral wheels is mounted in a similar manner such as illustrated in Figure 11. In this case the numeral wheel 234 is provided with a hub 244 on which the pre-selecting numeral wheel 240 is mounted, said wheel being movable longitudinally of the hub 244 but normally urged against the disc 246 by means of the spring 248, the disc 246 being preferably integral with the hub 244 and provided with the pin 250 normally receivable in a suitable aperture in the wheel 240.

The numeral wheel 234 is provided with a re-set pawl 252 adapted to be received in a notch 254 of the shaft 216 for re-setting operation. The numeral wheel 234 is also provided with a pivoted pawl 256 having cooperative engagement with the teeth of the ratchet wheel 258 mounted on the gear 260, said gear being rotatably mounted on the shaft 216 adjacent the disc 262 provided with a pair of teeth 264 corresponding to the teeth 228 and adapted to mesh with the spaced teeth on the gear 266, said gear being similar to the gear 222 and provided with teeth normally meshing with the teeth of the gear 260. The numerals on the pre-selecting numeral wheels are arranged in an opposite direction from those on the indicator wheels and the pre-selecting wheels are provided with the notches 268 adapted to receive the anti-friction wheel 270 of the lever 272. The wheel 270 is received in said notch when the zero numerals of both the pre-selecting wheel and the numeral wheels are aligned. Levers 272 are mounted on shaft 274, it being understood that the number of levers correspond to the number of pre-selecting wheels.

The shaft 274 is provided with a gear 276 meshing with the gear segment 278 mounted on the shaft 280, said shaft being provided with the switch arm 282. When each of the arms 272 are in their respective notches 268 the arm 282 will be moved in a counter-clockwise direction, as viewed in Figure 13, to close the contacts of the switch arms 284 and 286.

Closing the switch arms 284 and 286 will energize the solenoid 288 to open the by-pass valve 290 disposed in the pump 26 whereby liquid will be by-passed in the pump so it will not be supplied to the nozzle, thereby rendering the liquid dispensing apparatus inoperative. It is also to be understood that the solenoid may be applied in the nozzle whereby when the solenoid is operated the nozzle valve will be automatically closed. The solenoid may also be operated to open the motor switch to thereby render the apparatus inoperative. As already explained, the mechanism is duplicated for the dial 58, and therefore the same numerals are applied to this mechanism, and as the lower part of Figure 13 is broken away it will be appreciated that similar switch mechanism may be applied to the lower counter and operated in a similar manner so that either or both sets of dials may be pre-determined to operate the solenoid.

In order to set the pre-determining mechanism the bell-crank 292 is pivoted to the casing at 294, the arm 296 of the bell-crank being adapted to be hand operated, that is, moved in a counter-clockwise direction as viewed in Figure 12, causing arm 298 to engage the levers 272 to remove the levers from their respective notches, whereupon the pre-selecting wheels may be moved on the hubs 244 against the springs 248 until the pin 250 is disengaged whereupon the wheel 240 may be set to its desired numeral. When the series of wheels are so set the shaft 280 is not operated to close the switch until each arm 272 falls into its respective notch, at which time the last arm so falling will cause the shaft 280 to be revolved to close the switch arms 284 and 286 to thereby operate the solenoid.

In order to reset the mechanism to zero position the knob 299 is provided pivoted to the casing, the knob being provided with the shaft 300 having sprocket 302 in engagement with a chain 304, the chain meshing with the sprockets 306 and 308 mounted on the resetting shafts, each resetting shaft being provided with a clutch 310 adapted to slip when each of the rollers of the arms 272 are received in their respective notches. In this way each dial can be reset to zero position from a single operating means. In the resetting operation, rotation of the shaft 216 in a counter-clockwise direction, as viewed in Figure 12, causes the notches 254 to engage the respective pawls 256 and as the pawls on the successive wheels are aligned they will only pick up at the zero position, so each numeral wheel can be readily returned to zero position. During resetting operation the clutch 230 will cause disengagement between the numeral wheels and the gear 214 and thus disconnect the numeral wheels from the drive shaft.

With this form of liquid dispensing apparatus, any amount of liquid to be dispensed may be pre-determined either by the amount of liquid itself or by the price to be expended, and regardless of such amount the corresponding price will be automatically calculated. Thus neither the service station owner nor the customer will be unfairly favored, nor can any mistake in calculating the cost of any amounts be made.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In liquid dispensing apparatus, the combination of a source of liquid supply, a pump the suction side of which is connected to said source, a meter connected to the outlet side of said pump and connected to dispensing means for measuring liquid dispensed through said dispensing means, and registering means operated by said meter for registering the amount of liquid dispensed and the cost of said liquid, and means for selectively changing the relation between the cost operating portion of said registering means and the amount operating portion thereof whereby the unit cost per unit amount dispensed may be varied.

2. In liquid dispensing apparatus, the combination of a source of liquid supply, a pump the suction side of which is connected to said source, a meter connected to the outlet side of said pump and connected to dispensing means for measuring liquid dispensed through said dispensing means, and registering means operated by said meter for registering the amount of liquid dispensed and the cost of said liquid, and means interposed between said registering means and meter for varying the unit cost of said liquid per unit of measure.

3. In liquid dispensing appartus, the combination of a source of liquid supply, a pump the suction side of which is connected to said source, a meter connected to the outlet side of said pump and connected to dispensing means for measuring liquid dispensed through said dispensing means, an operating shaft rotated by said meter, registering means operated by said meter, said registering means including a rotating shaft connected to said operating shaft, cams angularly disposed with respect to each other mounted on said shaft, a driven shaft, oscillating members mounted on said driven shaft and provided with lost motion means whereby oscillation of the members rotates the driven shaft in one direction, and means for moving said cams whereby the speed of rotation of said driven shaft is selectively varied with respect to said operating shaft.

4. In liquid dispensing apparatus, the combination of a source of liquid supply, a pump the suction side of which is connected to said source, a meter connected to the outlet side of said pump and connected to dispensing means for measuring liquid dispensed through said dispensing means, an operating shaft rotated by said meter, registering means operated by said meter, said registering means including a rotating shaft connected to said operating shaft, cams angularly disposed with respect to each other mounted on said shaft, a driven shaft, oscillating members mounted on said driven shaft and provided with lost motion means whereby oscillation of the members rotates the driven shaft in one direction, and calibrating means for changing the relation between said cams and oscillating members for selectively varying the speed of rotation of said driven shaft with respect to said operating shaft.

5. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, registering means for indicating the cost of the amount of liquid dispensed, and means controlled by the cost part of said registering means for rendering said apparatus inoperative when a predetermined sum is indicated.

6. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means operated by said meter, said means including a casing, a driving shaft journalled thereto and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled with respect to said operating shaft.

7. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said motor, registering means operated by said meter, said means including a casing, a driving shaft journalled thereto and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled, said driving shaft being connected to an indicator shaft whereby said last named indicator shaft operates at a constant speed regardless of the speed of said first named indicator shaft.

8. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means, said means including a casing, a driving shaft journalled thereto and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled with respect to said operating shaft.

9. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means, said means including a casing, a driving shaft journalled thereto and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled, said driving shaft being connected to an indicator shaft whereby said last named indicator shaft operates at a constant speed regardless of the speed of said first named indicator shaft.

10. In liquid dispensing apparatus, the combination of a source of liquid supply, a pump having a suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means operated by said meter, said means including a casing, a driving shaft journalled thereto and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled, said driving shaft being connected to an indicator shaft whereby said last named indicator shaft operates at a constant speed regardless of the speed of said first named indicator shaft, the calibrating means being movable so that the first named indicator shaft will cause registry at selected rates of movement of the second named indicator shaft.

11. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means operated by said meter, said means including a casing, a driving shaft journalled thereto and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled, said driving shaft being connected to an indicator shaft whereby said last named indicator shaft operates at a constant speed regardless of the speed of said first named indicator shaft, the reduction gears being selectively operated so that the first named indicator shaft will cause registry at selected rates of movement of the second named indicator shaft.

12. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means operated by said meter, said means including a casing, a driving shaft journalled thereto, and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled, said driving shaft being connected to an indicator shaft whereby said last named indicator shaft operates at a constant speed regardless of the speed of said first named indicator shaft, the calibrating means and the reduction gears being selectively operated so that the first named indicator shaft will cause registry at selected rates of movement of the second named indicator shaft.

13. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means, said means including a counter shaft, a numeral shaft having numeral wheels rotatably mounted thereon, said counter and numeral shafts being operated by said operating shaft, means for serially operating said numeral wheels whereby successive amounts are shown, and means associated with said numeral wheels for rendering said apparatus inoperative after said wheels reach a predetermined selected number.

14. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means operated by said meter said means including a casing, a driving shaft journalled thereto, and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled with respect to said operating shaft, said counter shaft being operatively associated with a numeral shaft having numeral wheels rotatably mounted thereon, means for serially operating said numeral wheels whereby successive amounts are shown, and means associated with said numeral wheels for rendering said apparatus inoperative after said wheels reach a predetermined selected number.

15. In liquid dispensing apparatus, the combination of a source of liquid supply, a pump having the suction side thereof connected to said source of liquid supply, a meter connected to the outlet side of said pump, a discharge hose connected to said meter for dispensing measured liquid, a valve controlled nozzle for controlling dispensing therefrom, an operating shaft rotated by said meter, registering means, said means including a casing, a driving shaft journalled thereto and connected to said operating shaft, a carriage movably mounted in said casing, a cam shaft journalled in said carriage and connected for rotation by said driving shaft, angularly disposed cams mounted on said cam shaft, a driven shaft mounted adjacent said cam shaft and provided with oscillatable cam fingers contacting said cams and adapted to be oscillated thereby, clutches between said driven shaft and said cam fingers whereby said driven shaft is rotated in only one direction, a counter shaft, reduction gears for selectively connecting the driven shaft to said counter shaft, calibrating means corresponding to said reduction gears for moving said carriage whereby the speed of said driven shaft is controlled with respect to said operating shaft, said counter shaft being operatively associated with a numeral shaft having numeral wheels rotatably mounted thereon, means for serially operating said numeral wheels whereby successive amounts are shown, and means associated with said numeral wheels for rendering said apparatus inoperative after said wheels reach a predetermined selected number.

16. In liquid dispensing apparatus, the combination of a source of liquid supply, a pump the suction side of which is connected to said source, a meter connected to the outlet side of said pump and connected to dispensing means for measuring liquid dispensed through said dispensing means, registering means operated by said meter for registering the amount of liquid dispensed and the cost of said liquid, and speed variator mechanism interposed between said meter and said registering mechanism.

17. In liquid dispensing apparatus, the combination of a source of liquid supply, a pump the suction side of which is connected to said source, a meter connected to the outlet side of said pump and connected to dispensing means for measuring liquid dispensed through said dispensing means, registering means operated by said meter for registering the amount of liquid dispensed and the cost of said liquid, and speed variator mechanism interposed between said meter and the cost operating portion of said registering mechanism.

18. In liquid dispensing apparatus, the combination of a source of liquid supply, a pump the suction side of which is connected to said source, a meter connected to the outlet side of said pump and connected to dispensing means for measuring liquid dispensed through said dispensing means, registering means operated by said meter for registering the amount of liquid dispensed and the cost of said liquid, and speed variator mechanism interposed between said meter and said registering mechanism, said variator being operated by said meter.

19. In liquid dispensing apparatus, the combination of a source of liquid supply, a pump the suction side of which is connected to said source, a meter connected to the outlet side of said pump and connected to dispensing means for measuring liquid dispensed through said dispensing means, registering means operated by said meter for registering the amount of liquid dispensed and the cost of said liquid, and speed variator mechanism interposed between said meter and the cost operating portion of said registering mechanism, said variator being operated by said meter.

20. In a liquid dispensing apparatus, the combination of a source of liquid supply, a pump having the suction side thereof connected to said source, a meter having the inlet side connected to said pump, dispensing means connected to the outlet side of said meter, a shaft operated by said meter, a pair of indicating dials, one of said dials showing the amount of liquid dispensed by said meter and the other of said dials showing the cost of the liquid dispensed, operation of said dials being controlled by said shaft, and means interposed between one of said dials and said shaft for varying the speed of said dial with respect to the other of said dials.

21. In a liquid dispensing apparatus, the combination of a source of liquid supply, a pump having the suction side thereof connected to said source, a meter having the inlet side connected to said pump, dispensing means connected to the outlet side of said meter, a shaft operated by said meter, a pair of indicating dials, one of said dials showing the amount of liquid dispensed by said meter and the other of said dials showing the cost of the liquid dispensed, operation of said dials being controlled by said shaft, and means interposed between said shaft and the price dial for varying the speed of said dial with respect to the other of said dials whereby the apparatus will selectively compute the total price of the liquid dispensed, said means being regulated for any change in unit price of the liquid.

22. In liquid dispensing apparatus, the combination of a source of liquid supply, a pump the suction side of which is connected to said source, a meter the inlet side of which is connected to the outlet side of said pump, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, and speed variating means interposed between said shaft and meter and connected to said driving connection, said last named means selectively varying the unit cost of liquid dispensed per unit of measure by varying the speed of said shaft.

23. In liquid dispensing apparatus, the combination of a source of liquid supply, a pump the suction side of which is connected to said source, a meter the inlet side of which is connected to the outlet side of said pump, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, and speed variating means interposed between said shaft and meter and connected to said driving connection, said last named means selectively varying the unit cost of liquid dispensed per unit of measure by varying the speed of said shaft, said speed variating means including a meter shaft operated by said driving connection, and reduction gearing interposed between said shafts movable to different engagements whereby the speed between the meter shaft and other shaft is relatively changed.

24. In liquid dispensing apparatus, the combination of a source of liquid supply, a pump the suction side of which is connected to said source, a meter the inlet side of which is connected to the outlet side of said pump, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, and speed variating means interposed between said shaft and meter and connected to said driving connection, said last named means selectively varying the unit cost of liquid dispensed per unit of measure by varying the speed of said shaft, said speed variating means including a meter shaft operated by said driving connection, a slidable carriage provided with a cam shaft operated by the meter shaft, means operated by the cam shaft for rotating said second named shaft, and reduction gearing between said second named and first named shafts movable to different engagements, whereby movement of said carriage and cam shaft and engagements of said gearing will vary the speed between the meter shaft and said first named shaft whereby the unit cost is varied.

25. In liquid dispensing apparatus, the combination of a source of liquid supply, a pump the suction side of which is connected to said source, a meter the inlet side of which is connected to the outlet side of said pump, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, and speed variating means interposed between said shaft and meter and connected to said driving connection, said last named means selectively varying the unit cost of liquid dispensed per unit of measure by varying the speed of said shaft, said speed variating means including a meter shaft operated by said driving connection, a slidable carriage provided with a cam shaft operated by the meter shaft, means operated by the cam shaft for rotating said second named shaft, and reduction gearing between said second named and first named shafts movable to different engagements, whereby movement of said carriage and cam shaft and engagements of said gearing will vary the speed between the meter shaft and said first named shaft whereby the unit cost is varied, and means for moving said carriage including calibrated scales related to said reduction gearing, and vernier controls for said scales for moving said carriage an increment of the scale calibrations.

26. In liquid dispensing apparatus, the combination of a source of liquid supply, a pump the suction side of which is connected to said source, a meter the inlet side of which is connected to the outlet side of said pump, said pump having a by-pass, dispensing means connected to said meter for delivering measured liquid therefrom, registering means operated by said meter for indicating the cost of the liquid dispensed, a switch associated with said registering means and electrically connected to a solenoid controlling said by-pass whereby when a selected price is indicated the switch operates said solenoid to cause the by-pass to become operative.

27. In liquid dispensing apparatus, the combination of a source of liquid supply, a pump the suction side of which is connected to said source, a meter the inlet side of which is connected to the outlet side of said pump, said pump having a by-pass, dispensing means connected to said meter for delivering measured liquid therefrom, registering means for indicating the cost of the liquid dispensed, said registering means including a series of associated numeral wheels adapted to be serially operated for total indications, a shaft for operating said numeral wheels, a switch associated with said registering means and electrically connected to a solenoid controlling said by-pass whereby when a selected price is indicated the switch operates said solenoid to cause the by-pass to become operative, and preselecting numeral wheels disposed adjacent said numeral wheels, and cooperating means therebetween whereby when said numeral wheels are moved to the same indications as said preselecting numeral wheels said switch will be operated.

28. In liquid dispensing apparatus, the combination of a source of liquid supply, a pump the suction side of which is connected to said source, a meter the inlet side of which is connected to the outlet side of said pump, said pump having a by-pass, dispensing means connected to said meter for delivering measured liquid therefrom, registering means for indicating the cost of the liquid dispensed, said registering means including a series of associated numeral wheels adapted to be serially operated for total indications, a shaft for operating said numeral wheels, control means operated by said registering means for controlling said by-pass whereby when a selected price is indicated, said means causes the by-pass to become operative, and preselecting numeral wheels disposed adjacent said numeral wheels, and cooperating means therebetween whereby when said numeral wheels are moved to the same indications as said preselecting numeral wheels said control means will be operated.

29. In liquid dispensing apparatus, the combination of a source of liquid supply, a pump the suction side of which is connected to said source, a meter the inlet side of which is connected to the outlet side of said pump, said pump having a by-pass, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, control means operated by said registering means for controlling said by-pass whereby when a selected price is indicated said control means causes the by-pass to become operative, and preselecting numeral wheels disposed adjacent said numeral wheels, and cooperating means therebetween whereby when said numeral wheels are moved to the same indications as said preselecting numeral wheels said control means will be operated, and speed variating means interposed between said shaft and meter and connected to said driving connection, said last named means selectively varying the unit cost of liquid dispensed per unit of measure by varying the speed of said shaft.

30. In liquid dispensing apparatus, the combination of a source of liquid supply, a pump the suction side of which is connected to said source, a meter the inlet side of which is connected to the outlet side of said pump, said pump having a by-pass, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, control means operated by said registering means for controlling said by-pass whereby when a selected price is indicated said control means causes the by-pass to become operative, and preselecting numeral wheels disposed adjacent said numeral wheels, and cooperating means therebetween whereby when said numeral wheels are moved to the same indications as said preselecting numeral wheels said control means will be operated, and speed variating means interposed between said shaft and meter and connected to said driving connection, said last named means selectively varying the unit cost of liquid dispensed per unit of measure by varying the speed of said shaft, said speed variating means including a meter shaft operated by said driving connection, and reduction gearing interposed between said shafts movable to different engagements whereby the speed between the meter shaft and other shaft is relatively changed.

31. In liquid dispensing apparatus, the combination of a source of liquid supply, a pump the suction side of which is connected to said source, a meter the inlet side of which is connected to the outlet side of said pump, said pump having a by-pass, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, control means operated by said registering means for controlling said by-pass whereby when a selected price is indicated said control means causes the by-pass to become operative, and pre-selecting numeral wheels disposed adjacent said numeral wheels, and cooperating means therebetween whereby when said numeral wheels are moved to the same indications as said preselecting numeral wheels said control means will be operated, and speed variating means interposed between said shaft and meter and connected to said driving connection, said last named means selectively varying the unit cost of liquid dispensed per unit of measure by varying the speed of said shaft, said speed variating means including a meter shaft operated by said driving connection, a slidable carriage provided with a cam shaft operated by the meter shaft, means operated by the cam shaft for rotating said second named shaft, and reduction gearing between said second named and first named shafts movable to different engagements, whereby movement of said carriage and cam shaft and engagements of said gearing will vary the speed between the meter shaft and said first named shaft whereby the unit cost is varied.

32. In liquid dispensing apparatus, the combination of a source of liquid supply, a pump the suction side of which is connected to said source, a meter the inlet side of which is connected to the outlet side of said pump, said pump having a by-pass, dispensing means connected to said meter for delivering measured liquid therefrom, said meter having a driving connection, registering means for indicating the cost of the liquid dispensed, said registering means including a series of associated numeral wheels adapted to be serially operated for total indications, a shaft for operating said numeral wheels, control means operated by said registering means for controlling said by-pass whereby when a selected price is indicated said control means causes the by-pass to become operative, and preselecting numeral wheels disposed adjacent said numeral wheels, and cooperating means therebetween whereby when said numeral wheels are moved to the same indications as said preselecting numeral wheels said control means will be operated, and speed variating means interposed between said shaft and meter and connected to said driving connection, said last named means selectively varying the unit cost of liquid dispensed per unit of measure by varying the speed of said shaft, said speed variating means including a meter shaft operated by said driving connection, a slidable carriage provided with a cam shaft operated by the meter shaft, means operated by the cam shaft for rotating said second named shaft, and reduction gearing between said second named and first named shafts movable to different engagements, whereby movement of said carriage and cam shaft and engagements of said gearing will vary the speed between the meter shaft and said first named shaft whereby the unit cost is varied, and means for moving said carriage including calibrated scales related to said reduction gearing, and vernier controls for said scales for moving said carriage an increment of the scale calibrations.

Signed at Fort Wayne, Indiana, this eighteenth day of May, 1932.

ROBERT J. JAUCH.
IVAN R. FARNHAM.
ROSS H. ARNOLD.

CERTIFICATE OF CORRECTION.

Patent No. 1,888,533.                                                    November 22, 1932.

ROBERT J. JAUCH ET AL.

It is hereby certified that error appears in the printed specification of the above numbered patent requiring correction as follows: In the heading to the specification, date of filing application, for "June 25, 1930. Serial No. 463,627" read "June 3, 1932. Serial No. 615,134"; page 2, line 76, for "into" read "with"; page 7, line 9, claim 7, for "motor" read "meter"; and that the said Letters Patent should be read with these corrections therein that the same may conform to the record of the case in the Patent Office.

Signed and sealed this 31st day of January, A. D. 1933.

M. J. Moore,
(Seal)                                                     Acting Commissioner of Patents.